(12) United States Patent
Eslambolchi et al.

(10) Patent No.: US 6,332,738 B1
(45) Date of Patent: Dec. 25, 2001

(54) FIBER OPTIC CABLE INSTALLATION METHOD AND APPARATUS

(75) Inventors: Hossein Eslambolchi, Basking Ridge, NJ (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/519,219

(22) Filed: Mar. 6, 2000

(51) Int. Cl.$^7$ .............................. F16L 1/028; G01R 31/08
(52) U.S. Cl. .................. 405/175; 405/157; 405/154.1; 324/509; 324/525; 324/551
(58) Field of Search ....................................... 405/177, 157, 405/175, 180, 181, 182, 183; 324/509, 512, 525, 531, 556

(56) References Cited

U.S. PATENT DOCUMENTS

| | | | |
|---|---|---|---|
| 3,648,282 | * | 3/1972 | Kelly ................................... 405/177 |
| 4,692,063 | * | 9/1987 | Conti ................................... 405/177 |
| 4,744,696 | * | 5/1988 | Vidler ................................... 405/180 |
| 4,793,183 | * | 12/1988 | Helmus et al. ...................... 73/432.1 |
| 4,896,997 | * | 1/1990 | Gaylin ................................. 405/156 |
| 5,576,973 | * | 11/1996 | Haddy ................................. 364/516 |
| 5,949,373 | * | 9/1999 | Eslambolchi et al. .......... 342/357.13 |
| 5,991,013 | * | 11/1999 | Eslambolchi et al. ............... 405/157 |

* cited by examiner

Primary Examiner—David Bagnell
Assistant Examiner—Frederick L. Lagman
(74) Attorney, Agent, or Firm—Robert B. Levy; Rohini K. Garg

(57) ABSTRACT

A fiber optic cable (10) is buried below ground, either by direct burial, or by being pulled through a previously buried duct. During cable burial, the instantaneous resistance between the sheath and ground (the sheath-to-ground resistance) is continuously monitored. If the instantaneous sheath-to-ground resistance drops below a prescribed value, an alarm is generated, signaling a sheath fault. During burial, the length of cable paid out and placed underground is monitored, thus providing an indication of the relative location of the sheath fault.

12 Claims, 2 Drawing Sheets

FIBER OPTIC CABLE INSTALLATION METHOD AND APPARATUS

TECHNICAL FIELD

This invention relates to a technique for installing a fiber optic cable.

BACKGROUND ART

Virtually all telecommunications carriers, such as AT&T, now employ fiber optic cables to carry telecommunications traffic between facilities. As compared to conventional copper cables, fiber optic cables afford much greater bandwidth and virtual immunity from cross talk and interference. Many telecommunications carriers bury their fiber optic cables underground for reasons of safety and esthetics. Several different methods exist for underground cable burial. For example, some carriers directly plow the fiber optic cable underground with no protective enclosure. Other carriers first plow a plastic duct underground and then pull the fiber optic through the duct via a rope placed in the duct prior to burial.

Regardless of the burial method, the metallic sheath of the cable must remain isolated from the earth. Any electrical contact between the sheath and ground will cause locating signals impressed on the sheath to pass to ground. Grounding the cable sheath makes detection of the locating signals very difficult using conventional electromagnetic signaling. Consequently, a technician must use other cable locating techniques that are more complicated and less reliable. For that reason, most owners of fiber optical cables demand integrity of the fiber optic cable sheath as part of the installation process. As an example, AT&T requires its fiber optic installation contractors to measure the resistance between the cable sheath and ground following installation. If the resistance exceeds 25,000 Ohms (25 K ohms), then a cable sheath fault exists which the contractor must repair.

In practice, locating sheath faults has proven difficult especially in a long cable run. For that reason, many cable installation contractors will ignore sheath faults during installation. Consequently, such sheath faults will remain, and potentially worsen.

Thus, there is need for a technique for detecting fiber optic cable sheath faults during installation.

BRIEF SUMMARY OF THE INVENTION

Briefly, in accordance with the preferred embodiment, there is provided a method for installing a metallic sheath fiber optic cable. The cable is buried, either by direct burial, or by being pulled through a previously buried duct. During cable burial, the instantaneous resistance between the sheath and ground (the sheath-to-ground resistance) is continuously monitored. If the instantaneous sheath-to-ground resistance drops below a prescribed value (typically 25 K ohms), an alarm is generated, signaling a sheath fault. During burial, the length of cable paid out and placed underground is monitored, thus providing an indication of the relative location of the sheath fault.

DETAILED DESCRIPTION

Figure 1:
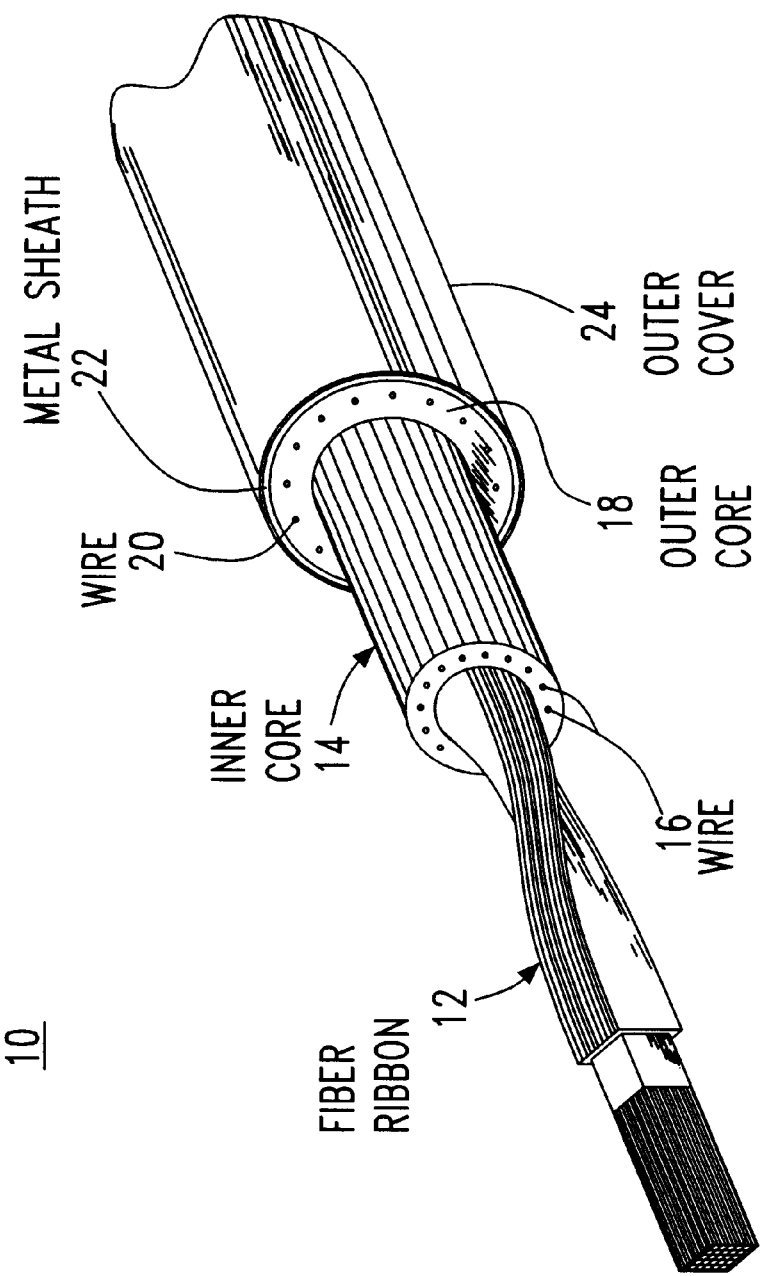
FIG. 1 is a partially cut-away view of a prior art fiber optic cable.

FIG. 1 depicts a portion of a conventional fiber optic cable 10 according to the prior art. The cable comprises a ribbon of individual fibers 12 (a fiber ribbon) surrounded by an inner core 14 fabricated from plastic or the like, embedded within which are metallic reinforcing wires 16-16. An outer core 18, also typically formed of plastic, surrounds the inner core 14. Like the inner core 14, the outer core 18 also has embedded metallic reinforcing wires 20-20. A metallic sheath 22 circumscribes the outer core 18. Surrounding the sheath 22 is a plastic outer cover 24.

In practice, the metallic sheath 22 carries a locating signal that enables a technician to locate the cable via electromagnetic signaling as described in U.S. Pat. No. 5,644,237, issued in the names of Hossein Eslambolchi and John S. Huffman, on Sep. 27, 1995, and assigned to AT&T (herein incorporated by reference). Should the sheath 22 become exposed through the outer cover 24 via a nick or scrape during burial, a sheath fault is then created, causing locating signals to readily pass to ground. Consequently, detection of such signals above ground becomes much more difficult.

Figure 2:
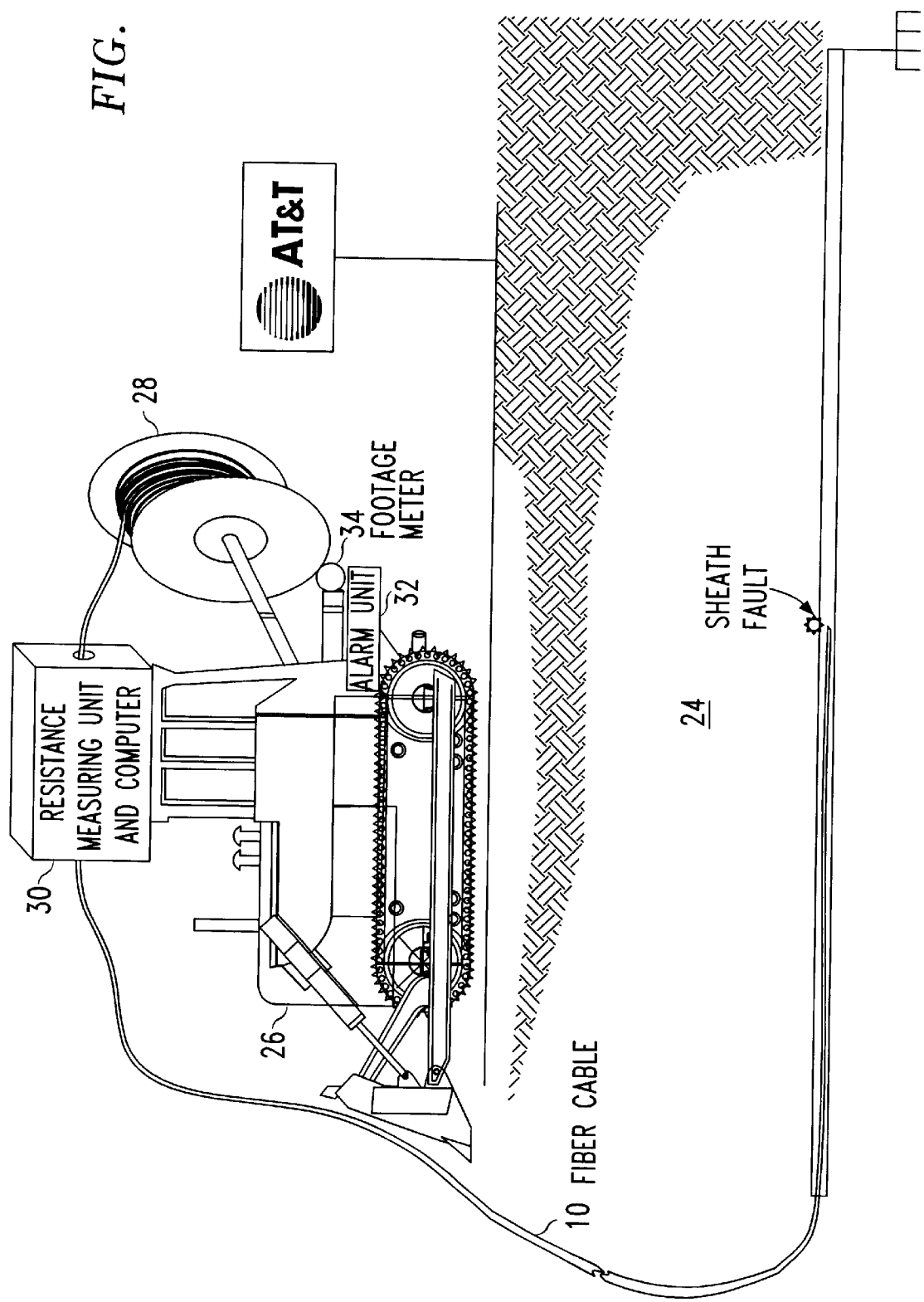
FIG. 2 is a block diagram illustrating the fiber optic cable installation technique of the invention.

FIG. 2 depicts a system 24 for burying the cable 10 of FIG. 1 below ground while continuously monitoring for sheath faults in accordance with the invention. A prime mover 26, in the form of a tractor or bulldozer, carries a rotatably mounted reel 28 carrying a quantity of the cable 10. As the prime mover 26 traverses an intended path of burial, the reel 28 pays out the cable 10 while a plow (now shown) on the prime mover plows the cable into the ground.

The prime mover 26 carries a resistance measuring unit and computer 30 that continuously monitors the resistance between the cable sheath 22 of FIG. 1 and the reel that is connected to ground 28 to obtain a measurement of resistance between the cable sheath and ground. In practice, the unit 30 comprises a personal computer, (e.g., a lap top computer) with either an inboard or outboard resistance measurement circuit board that typically includes a regulated voltage source, a resistance bridge, and an A/D converter. The instantaneous sheath-to-ground resistance measurement made by the resistance measuring unit and computer 30 provides a running check for potential sheath faults. An instantaneous drop in the sheath-to-ground resistance invariably occurs upon the occurrence of a sheath fault. Thus, by continuously monitoring the sheath-to-ground resistance as the cable 10 undergoes burial, the resistance measuring unit and computer 30 will detect the instant a sheath fault occurs, in contrast to the prior art technique in which a sheath-to-ground resistance measurement is made after burial of the entire cable.

Upon detecting a drop in the sheath-to-ground resistance, the resistance-measuring unit and computer 30 will typically signal an alarm unit 32. The alarm unit 32 may take the form of an audio device, such as a speaker, horn, buzzer, siren or the like that generates an audible warning in response to a sheath fault. Alternatively, the alarm unit can comprise a visual warning device, in the form of a light, a strobe lamp, or light emitting diode, for example, for generating a visual warning. Indeed, the alarm unit 32 may comprise the combination of an audio and visual warning device.

Upon the occurrence of a sheath fault, the operator of the prime mover 26 may immediate cease further movement, allowing a technician to immediately undertake a repair. In some instances, an immediate repair may prove infeasible, and thus necessitating a mechanism for establishing the relative location of the fault. To that end, the prime mover 26 may carry a footage meter 34 connected to the resistance-measuring unit and computer 30 for providing a running indication of the length of cable paid out from the reel 28 for recording by the unit 30. From knowledge of the length of cable paid out from the reel 28, as measured by the footage meter 34 at the instant of a drop in the cable sheath to-ground resistance, the relative location of the fault becomes known.

Alternatively, the resistance measuring unit and computer 30 could include a Global Positioning Satellite (GPS) Receiver for continuously determining the position of the prime mover. From knowledge of the location of the prime mover 26 at the instant of a drop in the cable sheath-to ground resistance, the relative location of the fault becomes known.

Assuming the path of burial traversed by the primer mover 26 comprises a relatively straight line, the distance traveled by the prime mover may also be employed for determining the film location. To that end, the resistance measuring unit and computer 30 could record the distance of prime mover 26 travel from signals received by an odometer (not shown) on the prime mover.

The installation method of the invention has been described in the context of direct burial of the cable 10 underground. However, the method of the invention is equally useful for instances when the cable 10 undergoes burial within a plastic conduit (not shown) that is first plowed into the ground and the cable 10 is thereafter paid out from reel 28 and pulled through the conduit via a rope. As the cable is pulled through the duct, the length of the rope is recorded, such as by the footage meter 34, which, like reel 28 will remain stationary under such circumstances. As the rope is pulled through the duct to install the cable 10, the resistance measuring unit and computer 30 measures the sheath-to-ground resistance. If sheath-to-ground resistance drops below a prescribed level, then a sheath fault has occurred. From knowledge of the cable pulled through the duct, the relative position of the sheath fault may be calculated.

The foregoing describes a technique for installing a fiber optic cable 10 that provides for instantaneous detection of sheath faults.

The above described embodiments are merely illustrative of the principles of the invention. Those skilled in the art may make various modifications and changes, which will embody the principles of the invention and fall within the spirit and scope thereof.

What is claimed is:

1. A method for installing metallic sheath fiber optic cable, comprising the steps of:
   burying the cable underground;
   continuously monitoring instantaneous sheath-to-ground resistance as the cable is buried to detect sheath fault; and
   generating an alarm once the instantaneous sheath-to-ground resistance falls below a prescribed value as occurs upon a sheath fault.

2. The method according to claim 1 further including the step of determining the relative position of the sheath fault once it has occurred.

3. The method according to claim 2 wherein the step of determining the relative position of the sheath fault includes the step of continuously measuring how much cable has been buried.

4. The method according to claim 1 wherein the step of burying the cable includes the step of plowing the cable directly underground.

5. The method according to claim 1 wherein the step of burying the cable underground includes the steps of:
   plowing a duct underground: and
   pulling the cable through the duct.

6. The method according to claim 1 wherein the step of generating an alarm comprises the step of providing an audible alert.

7. The method according to claim 1 wherein the step of generating an alarm comprises the step of providing a visual alert.

8. The method according to claim 1 wherein the step of generating an alarm comprises the step of providing an audible and visual alert.

9. Apparatus for installing a fiber optic cable underground, comprising
   a prime mover for plowing the cable underground;
   a resistance-measuring unit and computer for continually monitoring instantaneous sheath-to-ground resistance of the cable and for determining when the instantaneous sheath to ground resistance falls below a prescribed value as occurs upon a sheath fault; and
   an alarm for providing an alert in response to a signal from the resistance-measuring unit and computer when the instantaneous sheath-to-ground resistance falls below a prescribed value.

10. The apparatus according to claim 9 further including means for determining the relative location of the sheath fault.

11. The apparatus according to claim 10 wherein the means comprises a footage meter connected to the resistance-measuring unit and computer for providing a continuing indication of the length of the buried cable.

12. The apparatus according to claim 10 wherein the means comprises a global position satellite receiver for providing a continuing indication of the prime mover's position.

* * * * *